(12) United States Patent
Prekop et al.

(10) Patent No.: US 11,607,931 B2
(45) Date of Patent: Mar. 21, 2023

(54) TWO-PART SEAL FOR VEHICLE DOOR ASSEMBLY

(71) Applicant: Toyoda Gosei Co., Ltd., Kiyosu (JP)

(72) Inventors: Michael W. Prekop, Troy, MI (US); Derek Pauck, Troy, MI (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 293 days.

(21) Appl. No.: 17/004,683

(22) Filed: Aug. 27, 2020

(65) Prior Publication Data

US 2022/0063381 A1 Mar. 3, 2022

(51) Int. Cl.
*B60J 5/04* (2006.01)
*B60J 10/80* (2016.01)

(52) U.S. Cl.
CPC .......... *B60J 5/0411* (2013.01); *B60J 5/0418* (2013.01); *B60J 10/80* (2016.02)

(58) Field of Classification Search
CPC ......... B60J 5/0411; B60J 5/0418; B60J 10/80
USPC ...................................... 296/146.1
See application file for complete search history.

(56) References Cited

U.S. PATENT DOCUMENTS

| | | | | |
|---|---|---|---|---|
| 3,161,925 A | * | 12/1964 | Bertolini | B60J 10/86 220/378 |
| 4,015,368 A | * | 4/1977 | Court | E06B 7/2312 49/495.1 |
| 4,119,325 A | * | 10/1978 | Oakley | B60J 10/235 49/495.1 |
| 5,168,915 A | * | 12/1992 | Lafleur | E06B 3/66361 160/236 |
| 6,036,255 A | | 3/2000 | Lester et al. | |
| 6,158,171 A | * | 12/2000 | Kellogg | B60J 10/40 49/489.1 |
| 8,839,564 B2 | * | 9/2014 | Happel | E06B 7/2312 49/495.1 |
| 9,151,107 B2 | * | 10/2015 | Kaczmarczyk | E06B 7/2309 |
| 9,845,638 B1 | * | 12/2017 | Cunningham | E06B 7/231 |
| 2016/0137043 A1 | * | 5/2016 | Baba | B60J 10/277 49/483.1 |
| 2019/0061487 A1 | | 2/2019 | Kleinhoffer | |

FOREIGN PATENT DOCUMENTS

| | | | | | |
|---|---|---|---|---|---|
| AT | 401956 B | * | 11/1996 | ........... | E05D 13/006 |
| AT | 406888 B | * | 8/2000 | ............... | E06B 7/14 |
| DE | 10061817 A1 | * | 7/2001 | .......... | B60J 10/0005 |
| EP | 0286836 B1 | * | 12/1991 | | |

(Continued)

*Primary Examiner* — Hilary L Gutman
(74) *Attorney, Agent, or Firm* — Christopher G. Darrow; Darrow Mustafa PC

(57) ABSTRACT

A seal for a vehicle door. The seal includes a lower seal member structured to be mounted to a lower vehicle door portion and an upper seal member structured to be mounted to an upper vehicle door portion. The upper seal member sealingly contacts the lower seal member when the upper vehicle door portion is mounted to the lower vehicle door portion. The lower seal member includes a projection structured to abut a portion of the lower vehicle door portion when the lower seal member is mounted to the lower vehicle door portion, so as to prevent a movement of the lower seal member and resulting misalignment between the upper and lower seal members during movement of the seal members into sealing contact with each other.

8 Claims, 6 Drawing Sheets

(56) References Cited

FOREIGN PATENT DOCUMENTS

| FR | 2583359 | A1 | * | 12/1986 | ............. | B60J 10/25 |
| FR | 2995260 | A1 | * | 3/2014 | ............. | B60J 10/30 |
| WO | WO-9619633 | A1 | * | 6/1996 | ............. | E06B 3/485 |

* cited by examiner

TWO-PART SEAL FOR VEHICLE DOOR ASSEMBLY

TECHNICAL FIELD

The present invention relates to weather seals for vehicles and, more particularly, to a two-part seal incorporated into a two-part vehicle door assembly.

BACKGROUND

Some vehicle designs may incorporate a door assembly formed from a lower door portion and an upper door portion joined together. A seal may be provided along a seam extending between the upper and lower door portions to prevent moisture and wind from entering the vehicle interior through the seam. The seal may include an upper seal portion attached to the upper door portion and a lower seal portion attached to the lower door portion. During assembly of the upper and lower door portions to each other and engagement of the upper and lower seal portions, one or more of the upper and lower seal portions may be deflected out of an optimum sealing position or orientation. This can lead to misalignment of the one or more portions of the seal when the upper and lower door portions are joined. The result may be a seal which is defective and fails to exclude moisture and wind from the vehicle interior as desired.

SUMMARY

In one aspect of the embodiments described herein, a seal is provided for a vehicle door. The seal includes a lower seal member structured to be mounted to a lower vehicle door portion and an upper seal member structured to be mounted to an upper vehicle door portion. The upper seal member is structured to sealingly contact the lower seal member when the upper vehicle door portion is mounted to the lower vehicle door portion. The lower seal member includes a projection structured to abut a portion of the lower vehicle door portion when the lower seal member is mounted to the lower vehicle door portion, so as to prevent a movement of the lower seal member in a direction toward the portion of the lower vehicle door portion during movement of one of the lower seal member and the upper seal member toward sealing contact with the other one of the lower seal member and the upper seal member.

In another aspect of the embodiments described herein, a seal is provided for a vehicle door. The seal includes a lower seal member structured to be mounted to a lower vehicle door portion and an upper seal member structured to be mounted to an upper vehicle door portion and to sealingly contact the lower seal member when the upper vehicle door portion is mounted to the lower vehicle door portion. The upper seal member includes a projection, and the lower seal member includes a receptacle defining a cavity structured to receive the upper seal member projection therein. The cavity has one or more walls structured to be contacted by the upper seal member projection during movement of one of the lower seal member and the upper seal member toward sealing contact with the other one of the lower seal member and the upper seal member, so as to align the upper seal member with respect to the lower seal member.

In another aspect of the embodiments described herein, a vehicle door is provided. The door includes a lower vehicle door portion and a lower seal member mounted to the lower vehicle door portion. The lower seal member is structured to sealingly contact an upper seal member mounted on an upper vehicle door portion during assembly of the vehicle door. The lower seal member also includes a projection abutting a portion of the lower vehicle door portion so as to prevent a movement of the lower seal member in a direction toward the portion of the lower vehicle door portion during assembly of the vehicle door.

DETAILED DESCRIPTION

Embodiments described herein relate to a seal for a vehicle door formed from a lower door portion and an upper door portion. The seal includes a lower seal member mounted on the lower door portion and an upper seal member mounted on the upper door portion. The upper seal member and lower seal member are structured to sealingly contact each other when the upper vehicle door portion is mounted to the lower vehicle door portion to assemble the door. The sealing contact between the seal members provides a weather seal along a seam formed between the door portions. The upper seal member includes a projection having sloped sides. The lower seal member includes a receptacle defining a cavity structured to receive the upper seal member projection therein as the seal members are brought together into sealing contact to form the seal. The cavity may have sloped sides designed to complementarily engage the sloped sides of the upper seal member projection, so as to align the seals into optimum sealing engagement when the upper and lower door portions are connected. The lower seal member also includes a projection extending from the receptacle and structured to abut a portion of the lower vehicle door portion when the lower seal member is mounted to the lower vehicle door portion. The lower seal member projection abuts the portion of the lower door portion to prevent motion of the receptacle toward the portion of the vehicle door portion during engagement of the seal portions. This helps maintain the lower seal member cavity in alignment with the upper seal member projection so that optimum sealing contact between the upper and lower seal members may be achieved.

Figure 1:
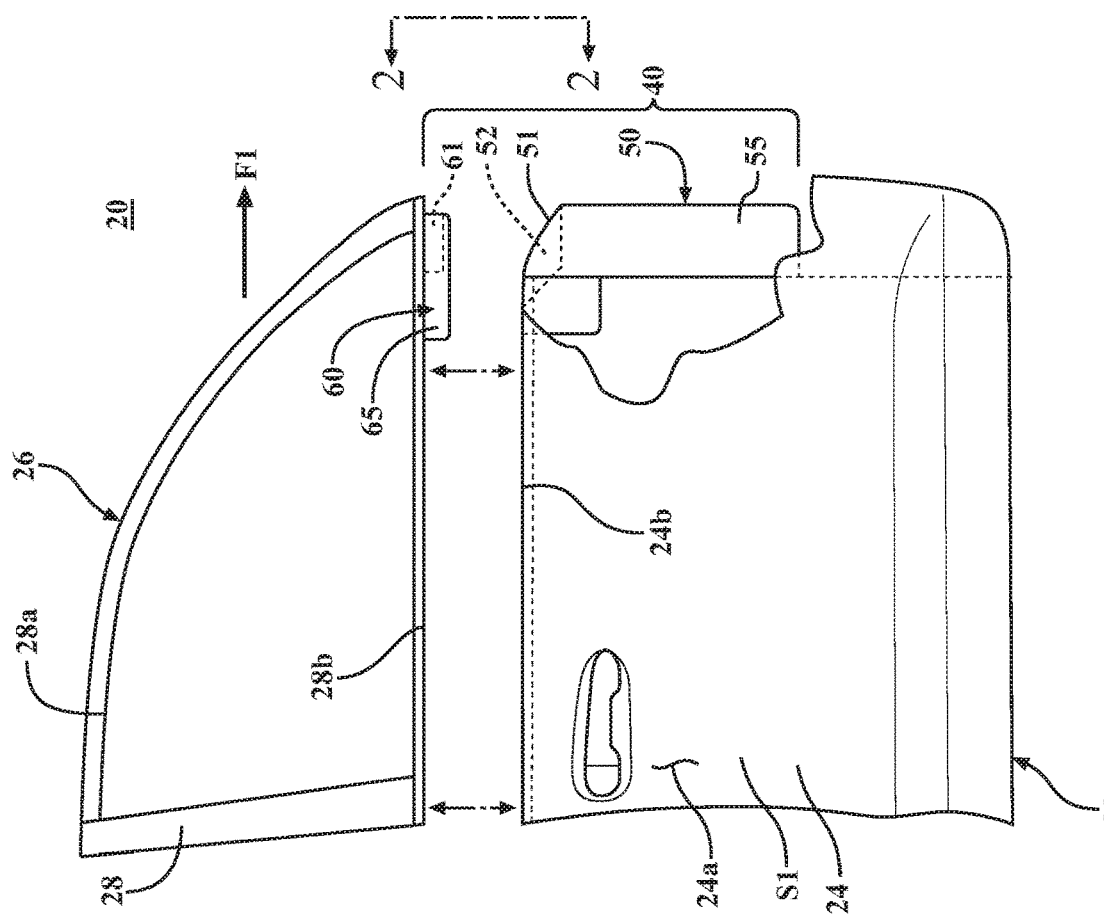
FIG. 1 is a schematic exploded side view of a two-part vehicle door incorporating a seal in accordance with an embodiment described herein.
Figure 3A:
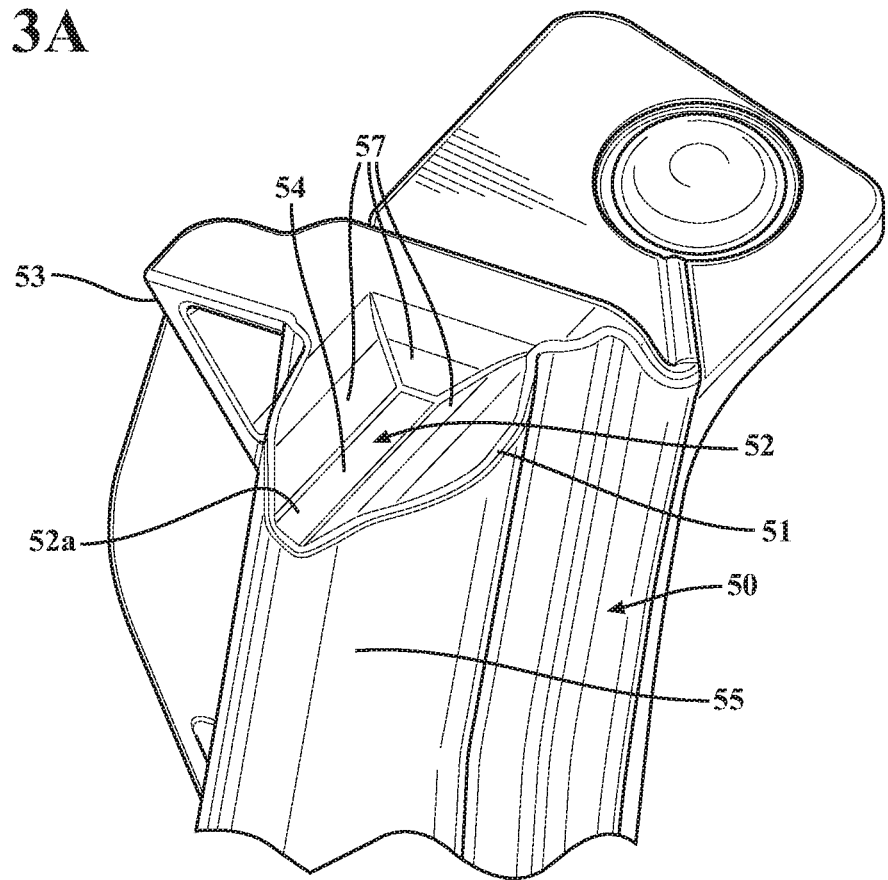
FIG. 3A is a schematic perspective view of a lower seal member of the seal of FIG. 1, showing a receptacle and projection of the lower seal member.
Figure 3B:
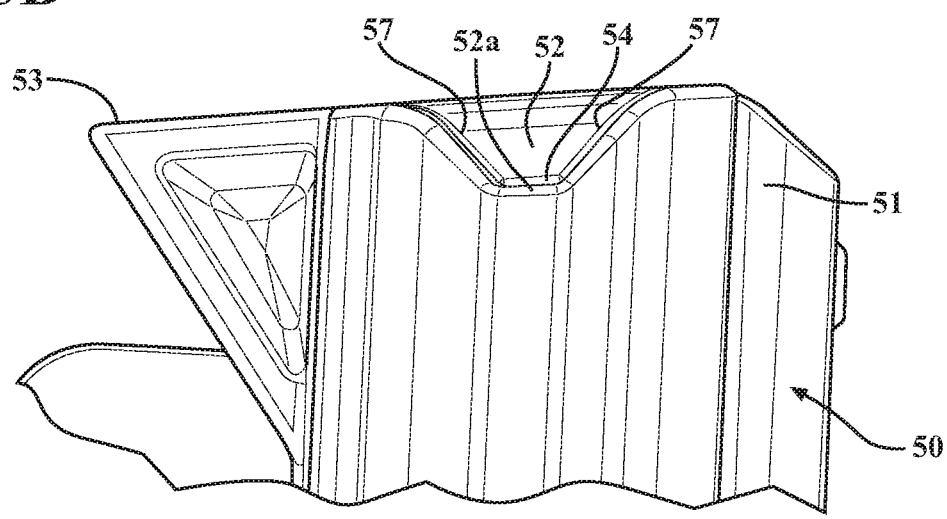
FIG. 3B is a schematic end view of the lower seal member shown in FIG. 3A.

FIG. 1 is a schematic exploded side view of a two-part vehicle door 20 incorporating a seal (generally designated 40) in accordance with an embodiment described herein. Arrow F1 shows a forward direction of a vehicle when the door 20 is mounted on the vehicle. In one or more arrangements, the door 20 may be formed from a lower door assembly 22 including a lower vehicle door portion 24 and an upper door assembly 26 including an upper vehicle door portion 28 formed separately from the lower door portion 24. The upper door assembly 26 may be secured to the lower door assembly 22 by welding, fasteners, and/or any other suitable method(s). As shown in FIG. 1, the upper door portion 28 may define a side window frame 28a of the vehicle while the lower door portion 24 may form a body 24a of the door 20 supporting the upper door portion 28.

Referring to FIG. 1, seal 40 may be incorporated into the door 20 to prevent rain, wind, dust, etc. from migrating from outside the vehicle to the vehicle interior through seams between the upper and lower door assemblies 26, 22 and also (optionally) through seams formed between the vehicle door 20 and a body (not shown) of the vehicle. In one or more arrangements, the seal 40 may include a lower seal member 50 structured for mounting on the lower vehicle door portion 24. The seal may also include an upper seal member 60 structured for mounting on the upper vehicle door portion 28. The lower and upper seal members 50, 60 may be structured to sealingly contact each other (i.e., so as to provide a moisture-tight seal therebetween) when the upper and lower vehicle door portions 28, 24 are secured to each other during door assembly. Thus, sealing contact between the upper and lower seal members 60, 50 is considered to be established when the upper and lower portions 28, 24 of the vehicle door 20 are in their final relative positions for securement to each other and a moisture-tight seal has been formed between the upper and lower seal members 60, 50.

In one or more arrangements, as seen in FIG. 1, the upper seal member 60 may be mounted to the upper door portion 28 along a lowermost edge 28b thereof and the lower seal member 50 may be mounted to the lower door portion 24 along an uppermost edge 24b of the lower door portion 24, so that a moisture-tight seal may be formed between the upper and lower door portions 28, 24 when the upper and lower door portions are secured to each other during assembly.

Figure 2:
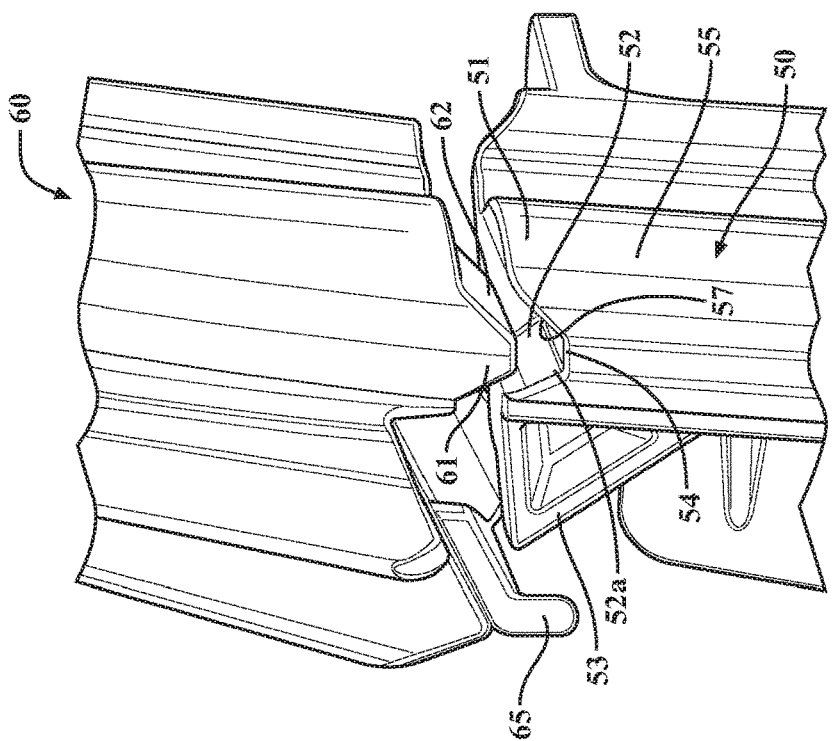
FIG. 2 is a partial schematic end view of upper and lower vehicle portions of the door of FIG. 1 shown prior to contact between upper and lower seal members mounted on the door portions.
Figure 5:
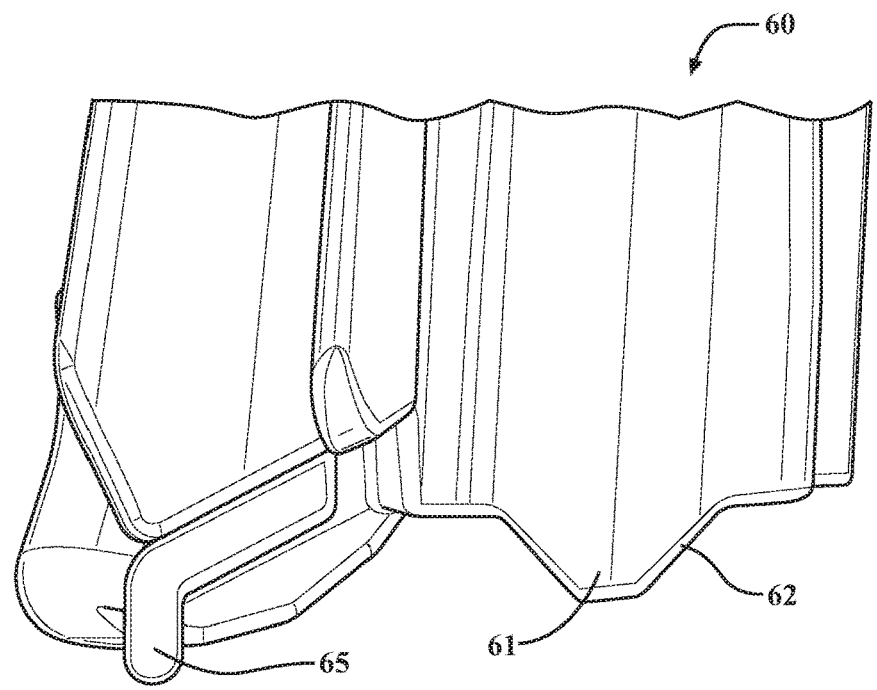
FIG. 5 is a schematic end view of an upper seal member of the seal of FIG. 1.

Referring to FIGS. 1, 2 and 5, in one or more arrangements, the upper seal member 60 may include a projection 61 structured to extend downwardly when the upper seal member 60 is secured to the upper door portion 28 and the upper door portion 28 is oriented in its end-use configuration (i.e., when the upper door portion 28 is oriented as it would be when the door 20 is mounted on a vehicle). The upper seal member projection 61 may be structured for insertion into a complementary cavity 52 (described in greater detail below) formed in the lower seal member 50, to engage the lower seal member 50 and to align the upper and lower seal members 60, 50 and the upper and lower portions 28, 24 for assembly purposes, as described herein.

In one or more embodiments, the upper seal member projection 61 may have one or more sloped sides 62 structured to help guide or lead the projection 61 into the lower seal member cavity 52. The sloped side(s) 62 may be structured for complementary engagement with sloped sidewall(s) 57 of the lower seal member cavity 52. Then, as the projection 61 is inserted deeper into the cavity 52, the upper door portion 28 and/or the lower door portion 24 may move into alignment with the each other.

Referring to FIGS. 1-4, in one or more arrangements, the lower seal member 50 may include a receptacle 51 defining the cavity 52 structured to receive the upper seal member projection 61 therein. As seen in FIGS. 1-4, the cavity 52 may have one or more sidewalls 57 which are sloped for complementary engagement with the sloped sides 62 of upper seal member projection 61. The sidewall(s) 57 may be sloped in a direction toward a floor 54 of the cavity 52. The sloped cavity sidewalls 57 may be structured to help guide or lead the upper seal member projection 61 into the lower seal member cavity 52 as the upper seal member 60 and lower seal member 50 are moved toward each other. Then, as the projection 61 is inserted deeper into the cavity 52, alignment between the upper and lower door portions 28, 24 is facilitated for door assembly. As seen in FIG. 6B, sealing contact may be made between projection 61 and cavity floor 54 when the projection 61 contacts the cavity floor 54. At this point, sealing contact may also be formed between the sloped receptacle sidewalls 57 and upper seal member projection 61. Sealing contact may also be formed between portions of the lower seal member outside the cavity 52 and adjacent the sloped receptacle sidewalls 57 and portions of the upper seal member adjacent projection 61.

An exterior side S1 (FIG. 6B) of the lower door portion 24 may be a side of the lower door portion structured to face toward an exterior of the vehicle when the lower door portion 24 is mounted on the vehicle. As the upper seal member projection 61 and the lower seal member receptacle sidewalls 57 contact each other during movement of the upper and lower seal members into sealing contact with each other, and depending on the relative positions of the upper door assembly 26 and the lower door assembly 22 prior to positioning of the door assemblies for attachment to each other, the projection 61 may force the receptacle 51 to move in a direction D1 (FIG. 4) toward the exterior side S1 of the lower door portion 24 and out of its optimal position for alignment with the upper seal member 60. To help prevent this movement of the receptacle 51, the lower seal member 50 may include a projection 53 structured to extend from the receptacle 51 in the direction D1 toward the exterior side S1 of the lower door portion 24 when the lower seal member 50 is mounted to the lower door portion 24. The projection 53 may be structured to abut a portion of the lower door portion 24 when the lower seal member 50 is mounted on the lower door portion 24, so as to prevent motion of the projection 53 and the receptacle 51 in the direction D1 toward the portion of the lower door portion 24 during movement of one of the lower seal member 50 and the upper seal member 60 into sealing contact with the other one of the lower seal member 50 and the upper seal member 60.

Figure 4:
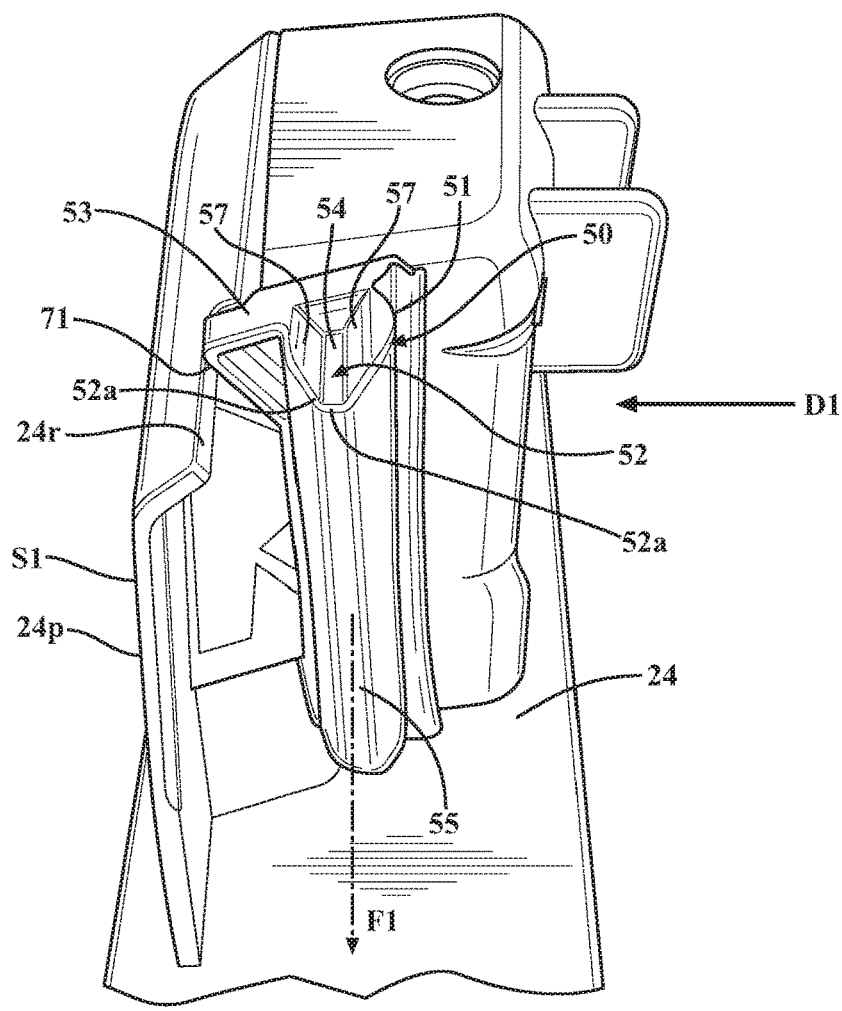
FIG. 4 is a schematic perspective frontal view showing the lower seal member of FIGS. 3A and 3B attached to a lower portion of a vehicle door, and showing a projection of the lower seal member abutting an outer door panel of the lower vehicle door portion.
Figure 6A:
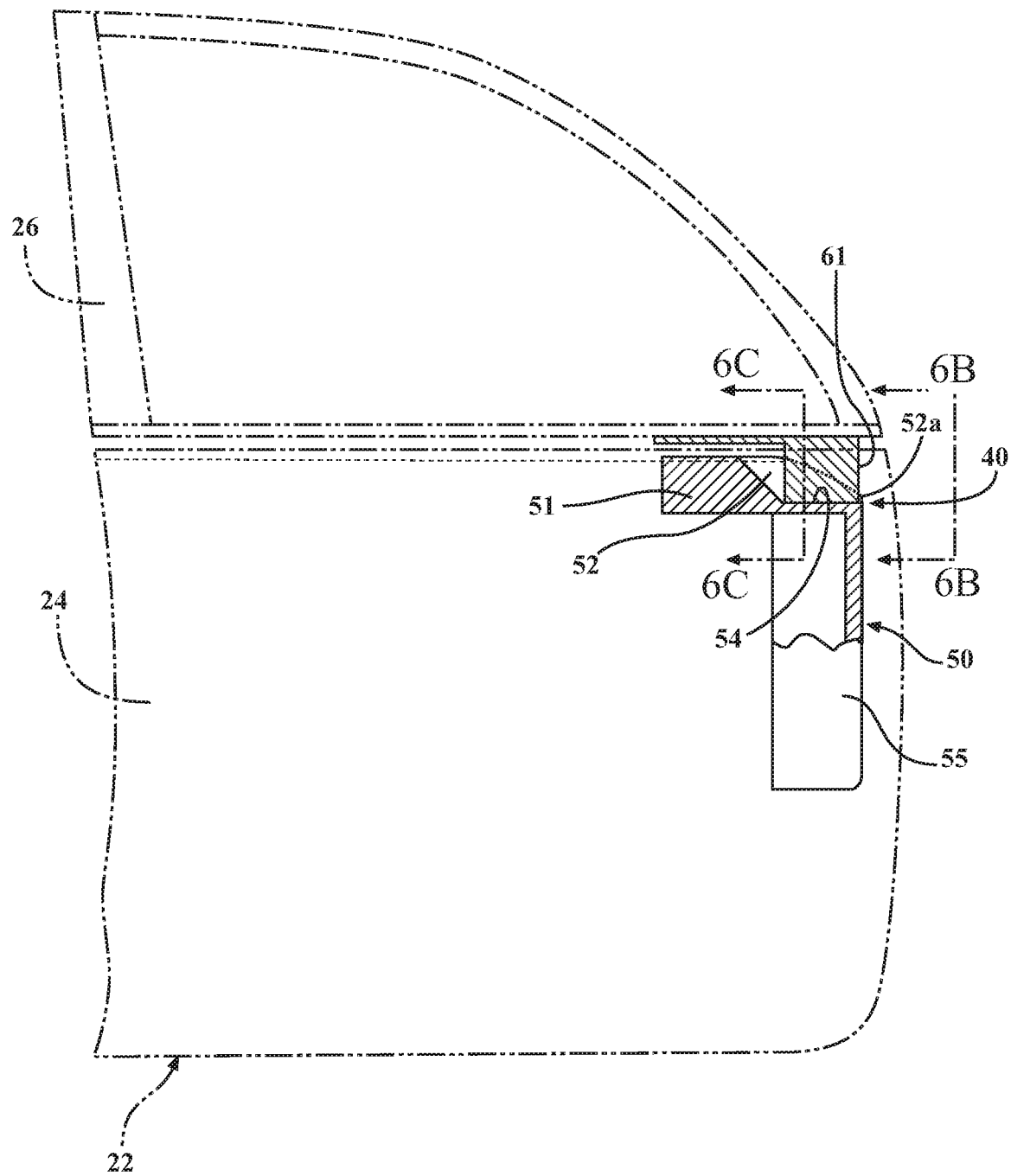
FIG. 6A is a schematic partial side cross-sectional view of the door of FIG. 1 showing portions of the upper and lower seal members in contact with each other to form a moisture-tight seal therebetween after attachment of the upper and lower door portions to each other.
Figure 6B:
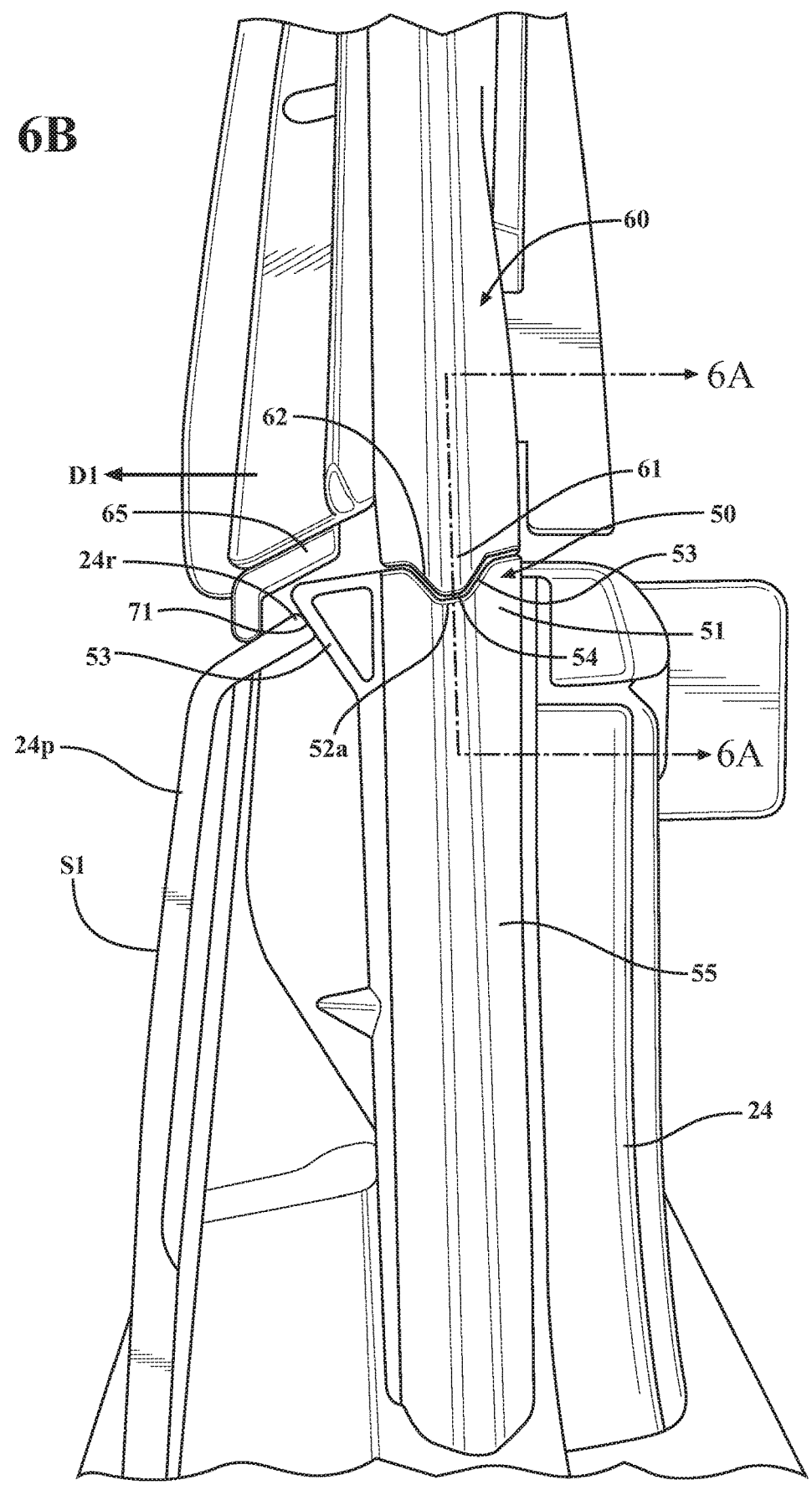
FIG. 6B is a schematic end view of a portion of the assembled door and mated upper and lower seal members shown in FIG. 6A.
Figure 6C:
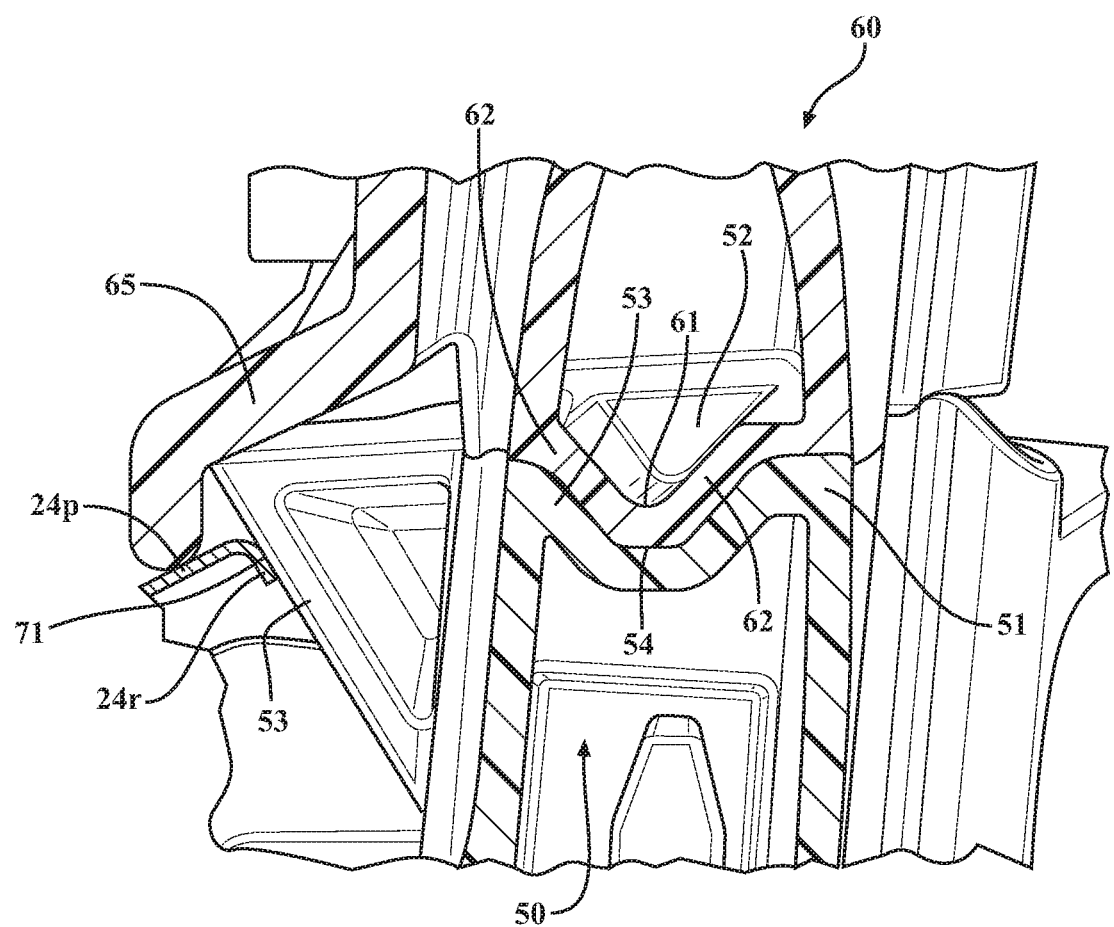
FIG. 6C is a cross-section view of portions of the mated upper and lower seals of FIG. 6B showing the moisture-tight seal formed between the seal members and the upper seal member ledge covering a seam formed where the lower seal member projection contacts the lower vehicle door portion.

In particular arrangements, and as seen in FIGS. 4, 6B, and 6C, the portion of the lower door portion 24 abutted by the lower seal member projection 53 may be an uppermost edge 24r of an outer panel 24p of the lower door portion 24. However, the projection 53 may be structured to contact any suitable portion of the lower door portion 24, depending on the design of the lower door portion, the structure of the lower door portion on which the seal 40 is to be mounted, and other factors.

Referring to FIGS. 2, 4, 6B, and 6C, in one or more arrangements, an end 52*a* (FIG. 6A) of the receptacle cavity 52 may be open in the direction F1 that would be toward a front of the vehicle when the door 20 is mounted on the vehicle. In addition, the receptacle cavity floor 54 may be sloped toward the open end 52*a* so as to direct a liquid residing in the cavity 52 toward the open end 52*a* and out of the cavity 52. The cavity open end 52*a* may be at a forward-most portion of the cavity 52 so that any moisture in the cavity may be discharged to run along an exterior of an extruded lower seal portion 55 (described in greater detail below) structured to extend from the receptacle 51. The extruded lower seal portion 55 may be structured to extend downwardly from the receptacle 51 when the lower seal member 50 is mounted to the lower door portion 24 and the lower door portion is mounted on a vehicle.

In one or more arrangements, the lower seal member receptacle 51 and projection 53 may be formed as a single piece, by molding or any other suitable method.

Referring to the drawings, in one or more arrangements, the lower seal member 50 may include the lower seal portion 55 extending from the receptacle 51 and structured to be securable to a forward-most edge of the lower portion of the vehicle lower door portion 24. In particular arrangements, the additional lower seal portion 55 may be an extruded part formed separately from the receptacle/projection. To attach the extruded additional lower seal portion 55 to the receptacle 51, the separately-formed extruded part may be positioned in a mold used to form the receptacle/projection 51/53. Molding material may then be injected into the mold to form the receptacle/projection, at which time the extruded part becomes bonded or molded onto the receptacle/projection. Other attachment methods may also be used.

Referring to FIGS. 4, 6B, and 6C, when the lower seal member projection 53 abuts the portion of the lower door portion 24, a seam 71 may be formed between the projection 53 and the portion of the lower door portion 24 abutting the projection 53. To help prevent moisture from entering this seam, the upper seal member 60 may include a cover ledge 65 extending from the upper seal member 60 over the lower seal member projection 53 and part of the lower door portion 24 so as to overlap and cover the seam 71 when the upper door portion 28 and the lower door portion 24 are secured to each other during final assembly of the door.

Materials usable for the various portions of the seal 40 may include any materials suitable for forming a seal or weather-stripping around openings on a vehicle. Possible materials include EPDM rubber, thermoplastic elastomer mixes of rubber and plastic, thermoplastic olefin polymer/filler blends, thermoplastic styrene polymer/filler blends, vinyl chloride resins, and any other suitable material(s).

FIG. 6A is a partial schematic side cross-sectional view of the door of FIG. 1 showing a condition where the upper door assembly 26 and lower door assembly 22 have been attached to each other to assemble the door 20. FIG. 6A shows portions of the upper and lower seal members 60, 50 of the seal 40 in contact with each other to form a moisture-tight seal therebetween after attachment of the upper and lower portions 28, 24 of the vehicle door 20 to each other.

Referring to FIGS. 6A-6C, as the upper and lower door assemblies 26, 22 move toward each other and the upper and lower seal members 60, 50 are moved into sealing contact, the upper seal member projection 61 contacts the sidewalls 57 of the lower seal member cavity 52 as previously described to align the seal members 50, 60 and the door portions 24, 28 with respect to each other. When the upper seal member projection 61 is in contact with the cavity floor 54, the upper and lower seal members 60, 50 are in sealing contact with each other and the upper and lower door portions 28, 24 should be properly aligned with each other and ready for securement to each other. The cover ledge 65 also covers the seam 71 formed between the lower seal member projection 53 and the lower door portion 24.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A seal for a vehicle door, the seal comprising:
a lower seal member structured to be mounted to a lower vehicle door portion; and
an upper seal member structured to be mounted to an upper vehicle door portion, the upper seal member being structured to sealingly contact the lower seal member when the upper vehicle door portion is mounted to the lower vehicle door portion,
the lower seal member including a projection structured to abut a portion of the lower vehicle door portion when the lower seal member is mounted to the lower vehicle door portion, so as to prevent a movement of the lower seal member in a direction toward the portion of the lower vehicle door portion during movement of one of the lower seal member and the upper seal member toward sealing contact with the other one of the lower seal member and the upper seal member,
wherein the upper seal member includes a projection, wherein the lower seal member includes a receptacle defining a cavity structured to receive the upper seal member projection therein, the cavity having one or more walls structured to be contacted by the upper seal member projection so as to align the upper seal member with respect to the lower seal member during movement of one of the lower seal member and the upper seal member toward sealing contact with the other one of the lower seal member and the upper seal member,
and wherein the receptacle cavity has an open end and a floor sloped in a direction toward the open end so as to direct a liquid residing in the cavity toward the receptacle cavity open end and out of the cavity.

2. The seal of claim 1 wherein the receptacle cavity includes at least one sidewall sloped in a direction toward the floor.

3. The seal of claim 2 wherein the upper seal member projection includes at least one side sloped for complementary engagement with the at least one sloped sidewall of the receptacle cavity during movement of the upper seal member into sealing contact with the lower seal member.

4. The seal of claim 1 wherein the lower seal member includes an extruded lower seal portion extending from the receptacle.

5. A seal for a vehicle door, the seal comprising:
   a lower seal member structured to be mounted to a lower vehicle door portion; and
   an upper seal member structured to be mounted to an upper vehicle door portion, the upper seal member being structured to sealingly contact the lower seal member when the upper vehicle door portion is mounted to the lower vehicle door portion,
   the lower seal member including a projection structured to abut a portion of the lower vehicle door portion when the lower seal member is mounted to the lower vehicle door portion, so as to prevent a movement of the lower seal member in a direction toward the portion of the lower vehicle door portion during movement of one of the lower seal member and the upper seal member toward sealing contact with the other one of the lower seal member and the upper seal member, and
   wherein the upper seal member includes a ledge structured to overlap a seam along which the lower seal member projection abuts the portion of the lower vehicle door portion.

6. The seal of claim 1 wherein the portion of the lower vehicle door portion is an outer door panel of the lower vehicle door portion.

7. A vehicle door comprising:
   a lower vehicle door portion; and
   a lower seal member mounted to the lower vehicle door portion and structured to sealingly contact an upper seal member mounted on an upper vehicle door portion during assembly of the vehicle door, the lower seal member including a projection abutting a portion of the lower vehicle door portion so as to prevent a movement of the lower seal member in a direction toward the portion of the lower vehicle door portion during assembly of the vehicle door;
   an upper vehicle door portion secured to the lower vehicle door portion, the upper vehicle door portion including the upper seal member mounted thereon, wherein the upper seal member includes a projection, wherein the lower seal member includes a receptacle defining a cavity receiving the upper seal member projection therein, the cavity having one or more walls sealingly contacted by the upper seal member projection, and wherein the lower seal member projection extends from the receptacle in a direction toward the portion of the lower vehicle door portion and abuts the portion of the lower vehicle door portion,
   and wherein the upper seal member includes a ledge overlapping a seam along which the lower seal member projection abuts the portion of the lower vehicle door portion.

8. The vehicle door of claim 7 wherein the lower seal member includes an extruded lower seal portion extending from the receptacle.

* * * * *